United States Patent
Fradkin et al.

(10) Patent No.: US 8,437,579 B2
(45) Date of Patent: May 7, 2013

(54) IMAGE PROCESSING SYSTEM FOR AUTOMATIC ADAPTATION OF A 3-D MESH MODEL ONTO A 3-D SURFACE OF AN OBJECT

(75) Inventors: Maxim Fradkin, Paris (FR); Jean-Michel Rouet, Paris (FR); Shérif Makram-Ebeid, Dampierre (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1463 days.

(21) Appl. No.: 10/535,466

(22) PCT Filed: Nov. 14, 2003

(86) PCT No.: PCT/IB03/05168
§ 371 (c)(1),
(2), (4) Date: May 17, 2005

(87) PCT Pub. No.: WO2004/047030
PCT Pub. Date: Jun. 3, 2004

(65) Prior Publication Data
US 2006/0078194 A1 Apr. 13, 2006

(30) Foreign Application Priority Data
Nov. 20, 2002 (EP) .................................. 02292884

(51) Int. Cl.
*G06K 9/32* (2006.01)
*G06K 9/00* (2006.01)

(52) U.S. Cl.
USPC ......................................... 382/299; 382/154

(58) Field of Classification Search .................. 382/154, 382/298, 299; 345/419
See application file for complete search history.

(56) References Cited

U.S. PATENT DOCUMENTS

| | | | |
|---|---|---|---|
| 5,461,655 A * | 10/1995 | Vuylsteke et al. | 345/428 |
| 6,201,889 B1 * | 3/2001 | Vannah | 382/131 |
| 6,262,739 B1 * | 7/2001 | Migdal et al. | 345/423 |
| 6,275,620 B2 | 8/2001 | De Queiroz et al. | |
| 6,351,262 B1 | 2/2002 | Edmark | |
| 6,404,920 B1 | 6/2002 | Hsu | |
| 6,968,299 B1 * | 11/2005 | Bernardini et al. | 345/424 |

FOREIGN PATENT DOCUMENTS

| | | |
|---|---|---|
| WO | WO9641469 A1 | 12/1996 |
| WO | WO9828710 A1 | 7/1998 |

OTHER PUBLICATIONS

"Simplex Meshes: a General Representation for 3D Shape Reconstruction" H. Delingette et al.
Delingette H, et al: General Object Reconstruction Based on Simplex Meshes, vol. 32, No. 2, Aug. 1999, pp. 111-142.
Pekar V, et al: Shape Model Based Adaptation of 3D Deformable Meshes for Segmentation of Medical Images, SPIE, vol. 4322, Feb. 2001 pp. 281-284.

* cited by examiner

*Primary Examiner* — John Strege

(57) ABSTRACT

An image processing system having means of automatic adaptation of 3-D surface Model to image features, for Model-based image segmentation, comprising: dynamic adaptation means for adapting the Model resolution to image features including locally setting higher resolution when reliable image features are found and setting lower resolution in the opposite case. This system comprises estimation means for estimating a feature confidence parameter for each image feature. The model resolution is locally adapted according to said parameter. The feature confidence parameter depends on the feature distance and on the estimation of quality of this feature including estimation of noise. The large distances and the noisy, although close features are penalized. The resolution of the Model is decreased in absence of confidence and is gradually increased with the rise of feature confidence.

19 Claims, 3 Drawing Sheets

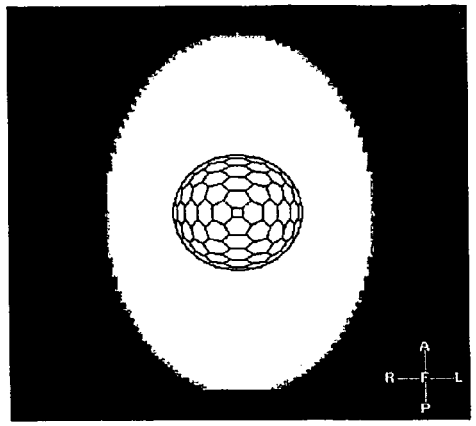
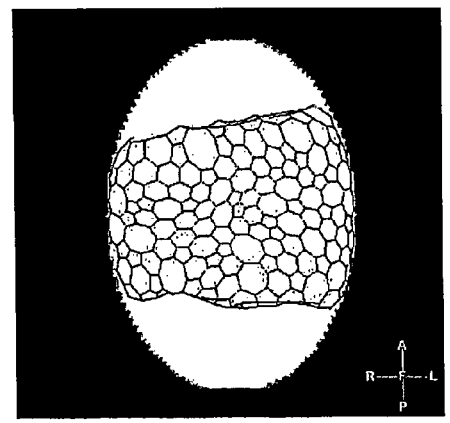
FIG.2A                FIG.2B
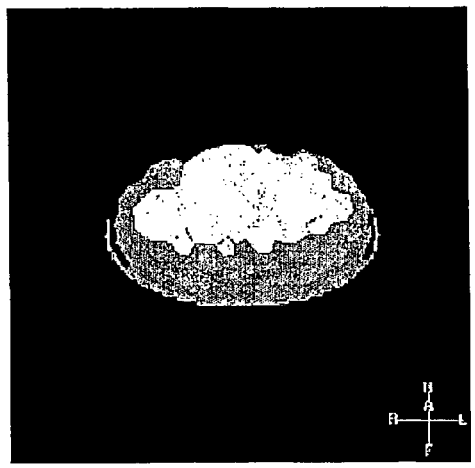
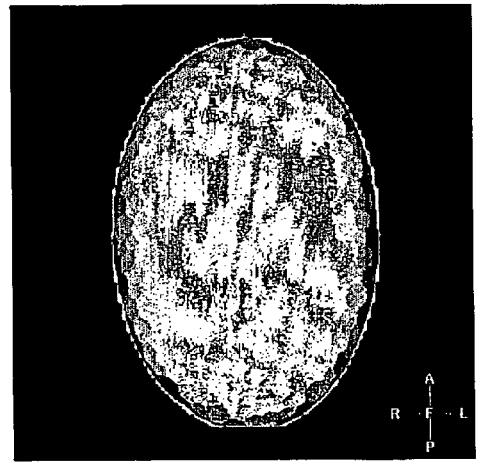
FIG.2C                FIG.2D

IMAGE PROCESSING SYSTEM FOR AUTOMATIC ADAPTATION OF A 3-D MESH MODEL ONTO A 3-D SURFACE OF AN OBJECT

FIELD OF THE INVENTION

The invention relates to an processing system for automatic adaptation of a 3-D mesh model onto the surface of an object in a medical image. The invention also relates to an image processing method having steps for operating said system. The invention applies to methods of segmentation of a three dimensional object in a three dimensional image, which often comprises an operation of fitting a three dimensional mesh model onto said three dimensional object. The invention further relates to a medical imaging apparatus coupled to such an image processing system and to program products for processing medical three dimensional images produced by this apparatus or system, for the segmentation of objects that are body organs in order to study or detect organ pathologies. The invention finds a particular application in the field of medical imaging.

BACKGROUND OF THE INVENTION

A technique of modelization of a 3-D object is already disclosed by H. DELINGETTE in the publication entitled "Simplex Meshes: a General Representation for 3D shape Reconstruction" in the "processing of the International Conference on Computer Vision and Pattern Recognition (CVPR'94), 20-24 Jun. 1994, Seattle, USA". In this paper, a physically based approach for recovering three-dimensional objects is presented. This approach is based on the geometry of "Simplex Meshes". Elastic behavior of the meshes is modeled by local stabilizing functions controlling the mean curvature through the simplex angle extracted at each vertex (node of the mesh). Those functions are viewpoint-invariant, intrinsic and scale-sensitive. Unlike deformable surfaces defined on regular grids, Simplex Meshes are very adaptive structures. A refinement process for increasing the mesh resolution at highly curved or inaccurate parts is also disclosed. Operations for connecting Simplex Meshes in order to recover complex models may be performed using parts having simpler shapes.

A Simplex Mesh has constant vertex connectivity. For representing 3-D surfaces, Simplex Meshes, which are called 2-D Simplex Meshes, where each vertex is connected to three neighboring vertices, are used. The structure of a Simplex Mesh is dual to the structure of a triangulation as illustrated by the FIG. 1 of the cited publication. It can represent all types of orientable surface. The contour on a Simplex Mesh is defined as a closed polygonal chain consisting of neighboring vertices on the Simplex Mesh. The contour is restricted to not intersect itself as far as possible. Contours are deformable models and are handled in independently of the Simplex Mesh where they are embedded. Four independent transformations are defined for achieving the whole range of possible mesh tnansformations. They consist in inserting or deleting edges in a face. The description of the Simplex Mesh also comprises the definition of a Simplex Angle that generalized the angle used in planar geometry; and the definition of metric parameters, which describe how the vertex is located with respect to its three neighbors. The dynamic of each vertex is given by a Newtonian law of motion. The deformation implies a force that constrains the shape to be smooth and a force that constrains the mesh to be close to the 3-D object. Internal forces determine the response of a physically based model to external constraints. The internal forces are expressed so that they be intrinsic viewpoint invariant and scale dependant. Similar types of constraints hold for contours.

Hence, the cited publication provides a simple model for representing a given 3-D object. It defines the forces to be applied in order to reshape and adjust the model onto the 3-D object of interest. The "Simplex Mesh technique" is a robust segmentation method.

SUMMARY OF THE INVENTION

It is an object of the invention to propose an image processing system having image data processing means for automatic adaptation of the mapping of a 3-D Mesh Model onto a three dimensional surface of an object represented in a gray level image; and having viewing means for displaying quantified and visual indications of the confidence of such a Mesh Model adaptation onto said object surface, in a coded manner, preferably in a color coded manner. Using the system processing means, the three-dimensional surface of the three dimensional object of interest is registered in a three dimensional gray level image. The three dimensional Simplex Mesh Model is fitted onto the three dimensional surface according to a mesh model technique for fitting at best said surface. In order to permit a user to appreciate the gradual improvement of adaptation of the Mesh Model with respect to the object surface, the system has means for estimating the adaptation for three-dimensional cells of the Mesh Model, and means for representing said cells of the Simplex Mesh Model colored according to a code of colors that permits of quantifying the cell adaptation with respect to the corresponding zone of the three dimensional object.

It is particularly an object of the invention to apply this system to the segmentation of three-dimensional medical images of body organs.

The proposed image processing system is claimed in claim 1.

It is also an object of the present invention to propose an image processing method having steps for operating this system. The invention also relates to a medical diagnostic imaging apparatus coupled to this system for 3-D image processing. The medical imaging apparatus may be an X-ray medical examination apparatus or any other 3-D medical imaging apparatus. The invention further relates to a program product or a program package for carrying out the image processing method.

BRIEF DESCRIPTION OF THE DRAWINGS

The invention is described hereafter in detail in reference to the following diagrammatic drawings, wherein:

FIG. 2A to FIG. 2D represent the Mesh Model in different phases of adaptation applied to an object of interest, in different orientations, with color coded indication of confidence rate (represented in gray shades);

DESCRIPTION OF THE PREFERRED EMBODIMENTS

An image processing method to be applied for example to a three dimensional digital image represented in gray levels is first described. The image may represent the noisy three dimensional surface of an organ called object of interest. In order to provide the user with abetter view of the object of interest, for instance with respect to the background, this object is segmented. The segmented image permits the user of better studying or detecting abnormalities or diseases of the organ. The present image processing method comprises several steps:

1) Acquisition of the 3-D Digital Image of the Object of Interest.

Figure 1A:
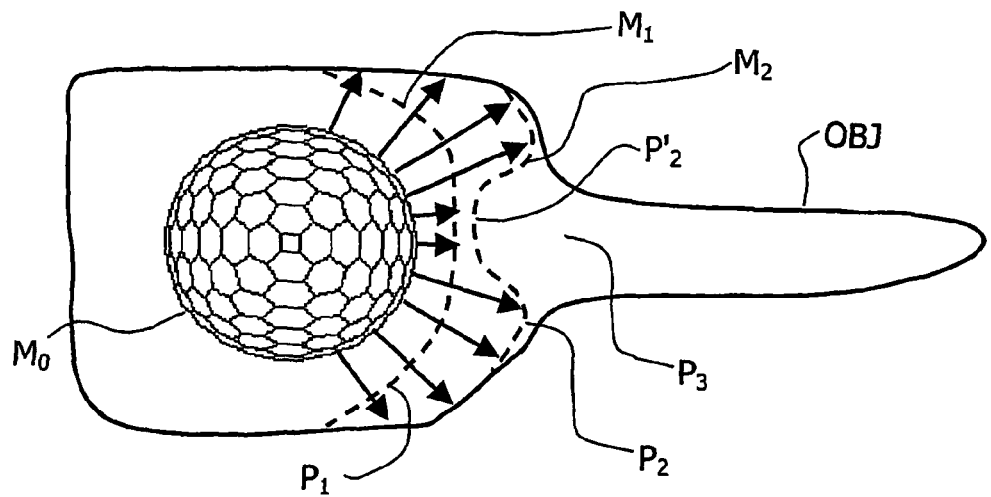
FIG. 1A represents an object of interest (an organ) with a Mesh Model (a sphere) for segmenting this object using a Mesh deformation technique and using a known technique of adaptation.
Figure 1B:
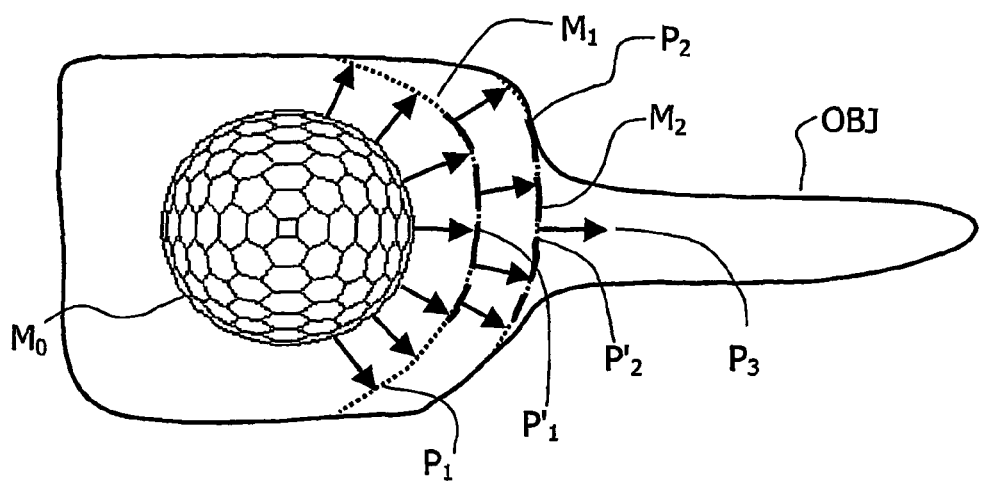
FIG. 1B represents an object of interest (an organ) with a Mesh Model (a sphere) for segmenting this object using a Mesh Model deformation technique and the adaptation technique of the invention.

The way the three-dimensional image is acquired is not part of the invention. The segmentation method could be applied to three-dimensional digital images of organs that can be acquired by ultrasound systems or X-ray apparatus or by other systems known of those skilled in the art. A three dimensional object, which is illustrated in FIG. 1A and FIG. 1B, has a complex surface denoted by OBJ. After the acquisition of the three dimensional image representing the three dimensional object of interest, said image is segmented. The segmentation technique that has been previously described in relation to the publication above cited as the state of the art is used because it is robust and gives excellent results. It is an iterative method that permits of representing the object of interest using the discrete model called Simplex Mesh Model.

The complex surface OBJ poses a problem when the segmentation method described above is applied. The present invention is able to solve this problem. The surface denoted by OBJ, represented in FIGS. 1A and 1B, has been chosen in order to demonstrate that the method of the invention may be applied to a great number of different and complex surfaces.

2) Generation of the Discrete Model called Simplex Mesh Model.

The image segmentation method is based on utilization of discrete deformable models, like 2-Simplex Meshes Model described as prior art [Delingette]. A three dimensional digital Simplex Mesh Model is generated as illustrated by FIG. 1A or FIG. 1B. In the present case, it is a simple sphere $M_0$ formed by a set of small three dimensional discrete curved faces called cells, which are linked by their boundaries called the edges of the Mesh Model, and which have common nodes called the vertices of the Mesh Model.

The segmentation operation consists in mapping the three dimensional Simplex Mesh Model $M_0$ of FIG. 1A or FIG. 1B onto a three dimensional object of interest denoted by OBJ as shown in FIG. 1A and FIG. 1B. In this example, the object of interest OBJ is a complex shape representing an organ. This organ surface can show a difficult geometry such as the one of FIGS. 1A and 1B, comprising a bulging surface with a tubular appendix of small diameter with respect to the rest of the organ, which extends through a wall of the organ.

In the case of the invention, the shape of the object to be segmented is initially unknown, and therefore the initial model has to be deformed in order to fit the shape of the object of interest OBJ. It seems difficult for the sphere to deform appropriately in order to map correctly the entirety of the surface of the complex shape of this body organ considering the complexity of said shape.

A three dimensional Mesh Model such as $M_0$ has constant vertex connectivity. As a matter of fact, a three dimensional surface is represented using the three dimensional Mesh Cells, where each given vertex is connected to three neighboring vertices. By neighbor vertex, it must be understood a vertex of a given cell that constitutes the second extremity of an edge of said cell starting at said given vertex. So, each given vertex is common to three Cells, hence is common to three angles and is the starting point of three edges. A Mesh Model such as $M_0$ can represent all types of three-dimensional surfaces using Mesh Transformations. Four independent transformations are defined for achieving the whole range of possible Mesh Transformations. They consist in inserting or in deleting vertices (nodes) in a cell; in defining angles in the cell; and in defining metric parameters that describe how the vertex is located with respect to its three neighbors. A law of motion defines the dynamic of each vertex. The deformation implies an internal force that constrains the shape of the Simplex Mesh Model to be smooth and an external force that constrains the three-dimensional Mesh Model to be close to the three dimensional object surface, in this example the surface OBJ.

According to the known technique [Delingette], the deformation of the Mesh Model is essentially function of the distance between the Mesh Model and the image data at each stage of the deformation. The Mesh Model is only attracted towards data points that are relatively close.

Unfortunately, this feature of the known technique is very unprofitable when applied to the object of interest shown in FIG. 1A. As illustrated by FIG. 1A, in a first stage of deformation, the sphere $M_0$ will reach the position $M_1$. And in a second stage, the Mesh will be attracted by the close image data in part $M_2$, while this Mesh will not go forward correctly in the parts P'1, P'2, since the image data are very far in P3. Hence, the deformation of the Mesh Model will be quit inadequate in this case. FIG. 1A illustrates this defect by showing the Model surface turning itself inside-out.

This shows that at early deformation stages, some image features, walls or boundaries, may be either quite far or hidden from the corresponding part of deformable Mesh Model, and thus a predetermined distance criterion cannot be used. In addition, in the presence of image noise and absence of real features, false features can attract the mesh Model. Thus, if the distance criterion were to be used, the local model resolution would not correspond to the data, which might lead to Model self-intersections. The deforming Model might intersect itself, resulting in wrong final segmentation.

Besides, a refinement is proposed by the cited publication. This refinement consists in introducing an algorithm for automatically increasing the Mesh resolution at parts of high curvature and at parts whose distance to the image data is higher than a threshold. Hence, at each iteration, the area of the spherical cells decreases. So, according to the known technique, since when the distance to the image data is large, as shown in FIG. 1A, the surface of the cells decreases and the number of cells increases, the refinement algorithm would be unable to improve the result in said parts P'1, P'2.

Instead, the present invention proposes a method for automatic adaptation of 3-D surface Model to image data in the context of model-based image segmentation, which allows to dynamically adapt the model resolution to image feature content. According to the invention, the Model resolution is locally set to higher resolution only when reliable image features are found and is locally set to lower resolution in the opposite case, when image features are far or are not reliable, for instance noisy. Increasing the resolution of the Mesh Model when the image features are reliable is completely contrary to the disclosure of the prior art that increases the resolution when the distance of the image features is larger than a threshold. Not only the present invention permits to prevent model self-intersections, but also it improves the computational effectiveness of the whole segmentation process.

According to the present invention, for each image feature, a feature confidence parameter is defined, and model resolution is locally adapted according to it. The feature confidence parameter depends on the feature distance and on the quality of the image data. Noisy, although close features are penalized. This technique allows of keeping rather coarse model resolution in absence of image features. Then this technique allows of increasing the model resolution gradually with the rise of feature confidence. Low local resolution in a part of the Model implies few cells of large areas, which constraints local surface curvature in that part, and thus prevents the Model surface from turning inside-out and from self-intersections.

As illustrated by FIG. 1B, The Model will have large cells in part P'2 at the stage M2 of the Model deformation. This permits the Model of properly continuing its propagation toward the part P3 of the object of interest, instead of turning inside-out as in FIG. 1A.

3) Segmentation of the 3-D Digital Images of the Sequence.

This segmentation operation consists in deforming the original spherical shape $M_0$ of the Simplex Mesh Model until it is mapped onto the object of interest OBJ, making its surface as close as possible to the surface of the object of interest OBJ. This operation is performed by iterative steps, according to an iterative law. This law permits of establishing a balance between external forces that are first forces of traction of the cells OBJ of the model towards the surface of the object of reference OBJ, i. e. they force the cell surfaces to be close to the object surface; and internal forces that are regularization forces for forcing of the general surface of the Mesh Model to be smooth.

FIG. 2A illustrates another example of object of interest OBJ to be segmented using a Mesh Model that is initially a sphere. In this example, the object of interest has elliptic diameters in all directions. In directions A and P the image features are far from the cells of the sphere. So, the model is attracted toward the closest image features as shown in FIG. 2B. But, instead of decreasing the size of the cells in A and P directions as in the prior art, according to the invention the size of cells in A and P direction is increased, which is performed by decimating cells. The object border in the directions R and L is close to the mesh and is strong. Therefore the feature confidence in these directions is high. On the contrary, the object borders in the directions A and P are thought strong but beyond the search range. Therefore, they are not "seen" by the mesh and their confidence is low.

Below a threshold of confidence, cells are grouped to form larger cells. This operation is called "decimation" since the number of cells becomes smaller. With this new arrangement of cells in A and P directions that are larger than in R and L directions, the propagation of the cells of the sphere is now homogeneous. This different from the prior art where the cells near the image features were propagating more rapidly resulting in the deformation shown in FIG. 2B.

According to the invention the cells that are nearer the image features pull the enlarge cells, which at their turn become closer and closer from the image features. As said cells become closer, they acquire more confidence. Since the image features become more reliable with respect to said cells, the resolution of the first enlarged cells is locally increased. Then, by degrees, the first enlarged cells are pulled by the image features that are more and more reliable, and their resolution is more and more increase until the deformation of the sphere is such that it fits the object of interest as illustrated by FIG. 2D.

4) Estimation of the Fitness of the Mapping Operation.

FIG. 2C and FIG. 2D represent the Mesh Model $M_0$ that is deformed after a given number of iterative steps performed according to the above-cited iterative law. The surfaces of the cells of the initial Mesh Model $M_0$ are attracted by the surface of the object of reference OBJ by the action of the external forces, while the internal forces smooth the Mesh Model surface, in such a manner that the shape of the Mesh Model is nearer and nearer of the shape of the object of reference.

According to the invention, the user may visually evaluate the confidence to bestow on the image features. In addition to the use of feature confidence for model adaptation, the present invention provides a visualization of the cells that are color coded in function of the confidence parameter. This visualization with different colors allows to supervise the deformation process and to locally assess its final quality.

Referring to FIG. 2C, which shows a cross section of the object of interest along the diameter RL and perpendicularly to AP, the cells at the center of the representation are those that are farer from points A and P. So, at the center of this representation, the decimated cells of low resolution are represented for instance in red, which is a very clear gray in FIG. 2C. Around these cells, the cells toward H and F directions are very near the image features and they have a high resolution. They are represented for instance in green, which is middle gray in FIG. 2C.

After a certain number of iteration, all the cells of the sphere are near the wall of the object of interest; the confidence rate is great and all the cells are green (or gray) as represented in FIG. 2D.

The automated technique of estimation of the adaptation comprises sub-steps of:

4.1) Constructing a Color Coding Table wherein predetermined colors are associated with given feature confidence for model adaptation represented by the confidence parameter. The present invention provides a visualization of the cells that are color coded in function of the confidence parameter. This visualization with different colors allows to supervise the deformation process and to locally assess its final quality.

A predetermined color may be associated to one confidence parameter value; colors may be classified in classes of colors, each class of colors corresponding to a range of confidence parameter values; each class of color may further be sub-divided according to a scale of hues for sub-dividing the range of confidence parameter values;

4.2) Estimating the confidence parameter value of a given cell of the Mesh Model;

4.3) Performing said confidence parameter value estimation for a predetermined number of cells of the Mesh Model; this estimation may be performed for all the cells or for a limited number of cells;

4.4) Performing a color coding operation wherein the confidence parameter value corresponding to a given cell of the Mesh Model $M_0$ is associated to a color given by the Color Coding Table and wherein said cell is attributed said color determined from the Color Coding Table corresponding to its confidence parameter value;

4.5) Displaying the image of the Mesh Model $M_0$ having cells colored according to the color coding operation;

4.6) Assessing the goodness of adaptation or the confidence according to the proportion of cells for which confidence parameter value reaches at least a predetermined level called confidence threshold or to the proportion of cells whose colors are in predetermined scales of colors or hues;

4.7) Taking a decision to refine the process of mapping the Mesh Model onto the object of reference or to stop said process.

The above-described steps 4.2) and 4.3) may be performed before the user actually displays the images of the Mesh Model by performing steps 4.4), 4.5) and 4.6) in order to obtain a visual evaluation of the goodness of fitness and take a decision to further go on with the process or not as in step 4.7).

According to the prior art, the user had to decide by himself whether the adaptation was sufficient or not. The goodness of adaptation has to be empirically estimating by performing a comparison between the shape of the object of reference and the Mesh Model and by visually estimating the distance between the cells of the Mesh Model and the corresponding zones of the object of reference in 2D slices.

Using the technique of the invention, the user disposes of an automatic quantified estimation of the goodness of adaptation of the Mesh Model with respect to the object of interest without to have to perform himself an approximate estimation. The color-coded cells of the Mesh Model provide automatically the user with a numerical and visual knowledge of said goodness of adaptation. In fact, the confidence parameter value, related to a given cell gives a representation of likelihood said given cell be close to and aligned with a surface of the object of interest in the 3D image. The greater the confidence parameter value related to said cell of the Mesh Model, the better said cell of the Mesh Model locally fits the surface of said object. Using this color-coded representation for each cell of the Mesh Model, the user can appreciate easily and rapidly the adaptation of each cell.

5) Refining the Fitness of the Matching Between the Mesh Model and the Object of Reference.

After a first estimation of the fitness as above described by performing steps 4.5), 4.6) and 4.7), the user may decide to go on the iterative steps in order to better this fitness.

An option is to freeze the cells that have already reached an acceptable or a predetermined degree of fitness. Freezing cells means that no more calculations are applied to said cells. In particular they are no more divided. Their actual surface area and their distance with respect to the surface of the object of interest do not change anymore. Their goodness of adaptation is automatically estimated by confidence parameter value of the cells and by their color or hue. The decision that the adaptation is good is taken in function of said estimation according to the threshold previously described. The frozen cells will have the same color and shape after the further operation of adaptation refining.

The iterative steps are stopped either when the user decides so by a simple visualization of the color-coded image of the resulting Mesh Model or by deciding that the process is automatically stopped when all the cells or a predetermined number of Cells have reached the predetermined threshold.

Figure 3:
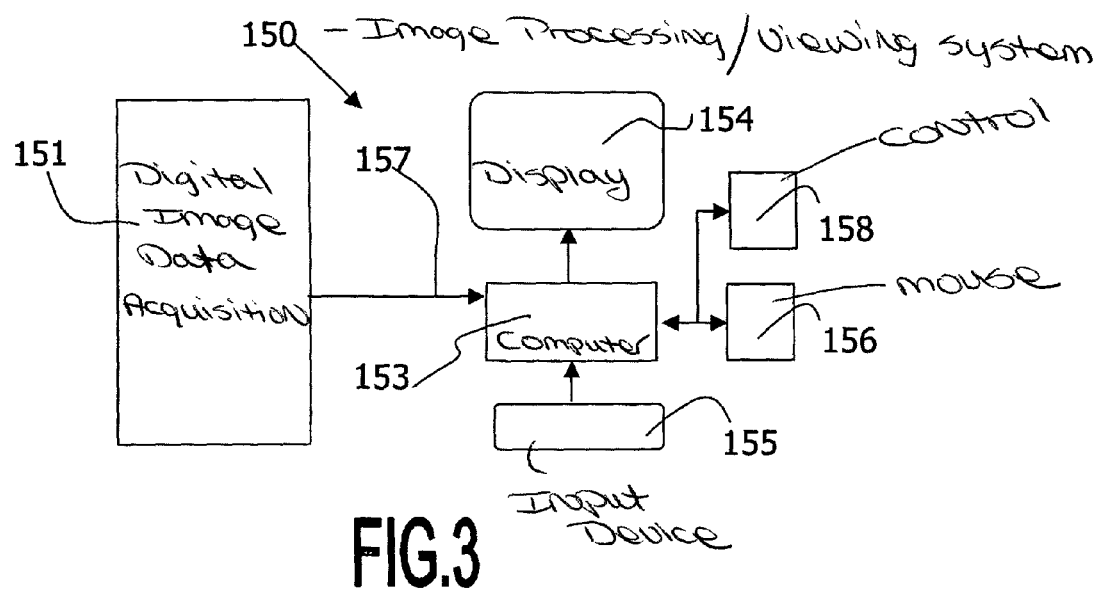
FIG. 3 illustrates a medical viewing system having means for carrying out the image processing method.

FIG. 3 shows a diagram of an image processing system 150 according to the invention for carrying out all the steps of the above-described method. The system has means 151 for acquiring digital image data of a sequence of images, and is coupled to computer means 153 for processing these data according to the processing steps of the method cited above. The medical viewing system can be used in the intervention room or near the intervention room for processing real time images. Steps of the present method can be applied on stored medical images, for example for estimating medical parameters. The medical viewing system provides the image data by connection 157 to the system 153. The system provides processed image data to display means and/or storage means. The display means 154 may be a screen. The storage means may be a memory of the system 153. Said storage means may be alternately external storage means. This image viewing system 153 may comprise a suitably programmed computer, or a special purpose processor having circuit means such as LUTs, Memories, Filters, Logic Operators, that are arranged to perform the functions of the method steps according to the invention. The system 153 may also comprise a keyboard 155 and a mouse 156. Icones may be provided on the screen to be activated by mouse-clicks, or special pushbuttons maybe provided on the system, to constitute control means 158 for the user to start, to control the duration or to stop the processing means of the system at chosen stages or phases.

Figure 4:
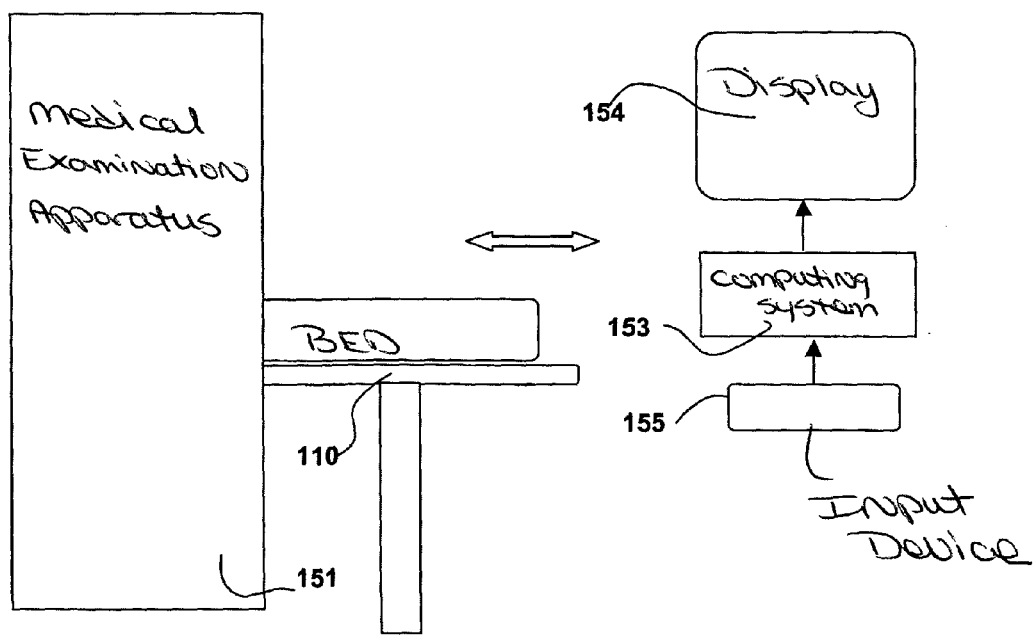
FIG. 4 illustrates a medical apparatus having such a viewing system.

FIG. 4 shows the basic components of an embodiment of an image processing system in accordance to the present invention, incorporated in a medical examination apparatus. As indicated schematically in FIG. 4, the medical examination apparatus typically includes a bed 110 on which the patient lies or another element for localizing the patient relative to the medical examination apparatus. The medical examination apparatus may be a CT scanner 151. The image data produced by the CT scanner 151 is fed to the system 153, such as a general-purpose computer, that carries out the steps of the method. The system 153 is typically associated with a visualization device, such as a monitor 154, and an input device 155, such as a keyboard, pointing device, etc. operative by the user so that he can interact with the system. The system 153 is programmed to implement a method of processing medical image data according to invention. In particular, the system 153 has computing means and memory means to perform the steps of the method. A computer program product having pre-programmed instructions to carry out the method may also be implemented.

The present invention is applicable regardless of the medical imaging technology that is used to generate the initial data. For example, when seeking to visualize the heart, magnetic resonance (MR) coronary angiography may be used to generate 3D medical image data in a non-invasive manner. Various modifications can be made to the order in which processing steps are performed in the above-described specific embodiment. The above-described processing steps applied to medical image data can advantageously be combined with various other known processing/visualization techniques. The drawings and their description herein before illustrate rather than limit the invention. It will be evident that there are numerous alternatives that fall within the scope of the appended claims. Moreover, although the present invention has been described in terms of generating image data for display, the present invention is intended to cover substantially any form of visualization of the image data including, but not limited to, display on a display device, and printing. Any reference sign in a claim should not be construed as limiting the claim.

The invention claimed is:

1. An image processing system, comprising:
image data processing means of automatic adaptation of 3-D Mesh Model to image features, for Model-based image segmentation, comprising means of dynamic adaptation of Model resolution to image features including means of locally setting higher resolution when reliable image features are found and means of setting lower resolution when unreliable image features are found, wherein reliability of an image feature is based on a feature confidence parameter, the feature confidence parameter depending on feature distance and noise; and
viewing means for visualizing images.

2. The image processing system of claim 1, having data processing means to define the feature confidence parameter for each image feature, and to locally adapt model resolution according to it.

3. The image processing system of claim 2, having data processing means to define a feature confidence parameter as a parameter that depends on the feature distance and on the estimation of quality of this feature including estimation of noise, and having data processing means to penalize the large distances and the noisy, although close features.

4. The image processing system of claim 3, having data processing means for decreasing the resolution of the Model in absence of confidence and gradually increasing the resolution of the Model with the rise of feature confidence.

5. The image processing system of claim 4, having data processing means for causing low local resolution to constrain local surface curvature, for preventing the model surface from self-intersections.

6. The image processing system of claim 5, having means to make feature confidence available for model adaptation, comprising means to display the Model regions with different colors representing the confidence at the location of said regions for the user to supervise the deformation process of the Model and to locally assess its final quality.

7. The image processing system of claim 6, for the segmentation of a three dimensional object in a three dimensional image including data processing means for mapping a three dimensional mesh model onto said three dimensional object comprising means for: Acquiring a three-dimensional image of an object of interest to be segmented, generating a Mesh Model, formed of polygonal cells and deforming the Mesh Model in order to map said Mesh Model onto said object of interest.

8. The image processing system of claim 7, further comprising means for: Constructing a Color Coding Table wherein predetermined colors are associated to given confidence parameter values; Associating the confidence parameter values of a given cell of the Mesh Model to a color given by the color coding Table corresponding to said confidence parameter values.

9. The image processing system of claim 8, further comprising data processing means for: Performing a color coding operation by attributing to said given cell, the color determined from the Color Coding Table, corresponding to the confidence parameter values; and display means for: Displaying the image of the Mesh Model having cells colored according to the color-coding operation.

10. The image processing system of claim 9, wherein the color-coding operation is performed for all the cells or for a predetermined number of cells.

11. The image processing system of claim 10, further comprising means for: Taking a decision to stop the process of mapping the Mesh Model onto the object of reference in function of a predetermined confidence level.

12. A medical imaging system comprising a suitably programmed computer or a special purpose processor having circuit means, which are arranged to form an image processing system as claimed in claim 11 to process medical image data; and display means to display the images.

13. A medical examination imaging apparatus having: Means to acquire a three-dimensional image of an organ of a body, and a medical imaging system according to claim 12.

14. A computer readable medium storing a program to control a system, said program comprising a set of instructions to be used in the system as claimed in claim 11.

15. An image processing method, comprising:
acquiring image data of a 3-D image with image features, and automatically adapting a 3-D Mesh Model to the image features, for Model-based image segmentation,
dynamically adapting Model resolution to the image features including locally setting higher resolution when reliable image features are found and locally setting lower resolution when unreliable image features are found, wherein reliability of an image feature is based on a feature confidence parameter, the feature confidence parameter depending on feature distance and noise; and
visualizing images.

16. The image processing system of claim 1, wherein the feature confidence parameter increases with as both the feature distance and the noise decrease.

17. The image processing system of claim 16, wherein the reliability of an image feature increases as the feature confidence parameter increases.

18. The image processing method of claim 15, wherein the feature confidence parameter increases with as both the feature distance and the noise decrease.

19. The image processing method of claim 18, wherein the reliability of an image feature increases as the feature confidence parameter increases.

* * * * *